United States Patent
Rosenberg et al.

(10) Patent No.: US 10,922,252 B2
(45) Date of Patent: Feb. 16, 2021

(54) EXTENDED MESSAGE SIGNALED INTERRUPTS (MSI) MESSAGE DATA

(71) Applicant: QUALCOMM Incorporated, San Diego, CA (US)

(72) Inventors: Ofer Rosenberg, Ramot Menashe (IL); Amit Gil, Zichron Yaakov (IL); James Lionel Panian, San Marcos, CA (US); Piyush Patel, Cary, NC (US); Shaul Yohai Yifrach, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 15/184,124

(22) Filed: Jun. 16, 2016

(65) Prior Publication Data

US 2016/0371208 A1     Dec. 22, 2016

Related U.S. Application Data

(60) Provisional application No. 62/182,800, filed on Jun. 22, 2015, provisional application No. 62/243,850, filed on Oct. 20, 2015.

(51) Int. Cl.
*G06F 13/24* (2006.01)
*G06F 13/42* (2006.01)

(52) U.S. Cl.
CPC .......... *G06F 13/24* (2013.01); *G06F 13/4282* (2013.01); *G06F 2213/0026* (2013.01); *Y02D 10/00* (2018.01)

(58) Field of Classification Search
CPC ............................. G06F 13/24; G06F 13/4282
See application file for complete search history.

(56) References Cited

U.S. PATENT DOCUMENTS

| | | | |
|---|---|---|---|
| 8,321,615 B2 | 11/2012 | Foong et al. | |
| 8,458,387 B2 | 6/2013 | Brice, Jr. et al. | |
| 8,631,181 B2 | 1/2014 | Feehrer et al. | |
| 2005/0154810 A1* | 7/2005 | Chong | G06F 9/4812 |
| | | | 710/200 |

(Continued)

FOREIGN PATENT DOCUMENTS

| | | |
|---|---|---|
| CN | 101681325 A | 3/2010 |
| JP | 2009169928 A | 7/2009 |

(Continued)

OTHER PUBLICATIONS

Author Unknown, "Message Signaled Interrupts," Wikipedia, The Free Encyclopedia, last modified on: Aug. 18, 2011, retrieved from http://en.wikipedia.org/wiki/Message_Signaled_Interrupts, 2 pages.

(Continued)

*Primary Examiner* — Tim T Vo
*Assistant Examiner* — Harry Z Wang
(74) *Attorney, Agent, or Firm* — Withrow & Terranova, PLLC

(57) ABSTRACT

Extended message signaled interrupts (MSI) data are disclosed. In one aspect, MSI bits are modified to include a system level identifier. In an exemplary aspect, an upper sixteen bits of the MSI message data are modified to be the system level identifier. By providing the system level identifier within the MSI message data, an interrupt controller can verify the interrupt source.

31 Claims, 10 Drawing Sheets

(56) References Cited

U.S. PATENT DOCUMENTS

| | | |
|---|---|---|
| 2006/0161707 A1 | 7/2006 | Davies et al. |
| 2006/0242332 A1 | 10/2006 | Johnsen et al. |
| 2007/0147426 A1* | 6/2007 | Sharma ............... G06F 13/4221 370/469 |
| 2008/0162762 A1 | 7/2008 | Neiger et al. |
| 2008/0276027 A1 | 11/2008 | Hagita |
| 2009/0235004 A1* | 9/2009 | Dang .................... G06F 13/24 710/267 |
| 2010/0262741 A1 | 10/2010 | Hayakawa et al. |
| 2011/0040915 A1* | 2/2011 | Strauss ................. G06F 9/4818 710/267 |
| 2011/0047309 A1 | 2/2011 | Brinkmann et al. |
| 2011/0302349 A1 | 12/2011 | Griggs |
| 2012/0036304 A1* | 2/2012 | Lais .................... G06F 13/4059 710/311 |
| 2012/0166582 A1 | 6/2012 | Binder et al. |
| 2013/0007332 A1* | 1/2013 | Teh ...................... G06F 13/385 710/313 |
| 2013/0080673 A1 | 3/2013 | Feehrer et al. |
| 2014/0006668 A1 | 1/2014 | Chew |
| 2015/0040124 A1* | 2/2015 | Tsirkin .................. G06F 9/4555 718/1 |
| 2015/0127865 A1* | 5/2015 | Sarta ...................... G06F 13/24 710/263 |
| 2016/0147679 A1* | 5/2016 | Guddeti .................. G06F 13/24 710/269 |

FOREIGN PATENT DOCUMENTS

| | | |
|---|---|---|
| TW | 201333828 A | 8/2013 |
| TW | 201337770 A | 9/2013 |

OTHER PUBLICATIONS

International Search Report and Written Opinion for PCT/US2016/038120, dated Sep. 23, 2016, 14 pages.

International Preliminary Report on Patentability for PCT/US2016/038120, dated Jun. 1, 2017, 23 pages.

Author Unknown, "Extended Message Data for MSI," PCI-SIG Engineering Change Notice, May 10, 2016, 6 pages.

European Search Report for European Patent Application No. 18182746.0, dated Dec. 5, 2018, 8 pages.

Yee, C. K. et al., "Scalable host controller for modular hardware accelerator," 2011 IEEE Symposium on Industrial Electronics and Applications, Sep. 25-28, 2011, Langkawi, Malaysia, IEEE, 4 pages.

Search Report for Taiwan Patent Application No. 105119457, completed May 11, 2020, 1 page.

Xilinx, "Xilinx Answer 58495—Xilinx PCI Express Interrupt Debugging Guide," Jan. 15, 2014, [Searched on Jul. 27, 2020], https://www.xilinx.com/Attachment/Xilinx_Answer_58495_PCIe_interrupt_Debugging_Guide.pdf, 18 pages.

Notice of Reasons for Refusal for Japanese Patent Application No. 2017564447, dated Aug. 11, 2020, 6 pages.

* cited by examiner

EXTENDED MESSAGE SIGNALED INTERRUPTS (MSI) MESSAGE DATA

PRIORITY APPLICATIONS

The present application claims priority to and the benefit of U.S. Provisional Patent Application Ser. No. 62/182,800, filed on Jun. 22, 2015, and entitled "ENHANCED MESSAGE SIGNALED INTERRUPTS FOR SYSTEM IDENTIFICATION," which is incorporated herein by reference in its entirety.

The present application also claims priority to and the benefit of U.S. Provisional Patent Application Ser. No. 62/243,850, filed on Oct. 20, 2015, and entitled "EXTENDED MESSAGE SIGNALED INTERRUPTS (MSI) MESSAGE DATA," which is incorporated herein by reference in its entirety.

BACKGROUND

I. Field of the Disclosure

The technology of the disclosure relates generally to a Peripheral Component Interconnect (PCI) communication bus.

II. Background

Mobile communication devices have become increasingly common in modern society. The increasing popularity of such mobile communication devices is driven, in part, by the increased functionality available on these devices. Such increased functionality is enabled by the inclusion of ever more complex integrated circuits (ICs) within the mobile communication devices. As the number and complexity of the ICs within the mobile communication devices has increased, so has the need for the various ICs to communicate with one another.

Several standards have been published outlining various protocols that allow ICs to communicate with one another. A popular protocol is the Peripheral Component Interconnect (PCI) protocol, which comes in various flavors, including the PCI express (PCIe) protocol. While useful as IC to IC communication protocols, the PCI and PCIe protocols may also be used to couple a mobile terminal to a remote device through a cable or other connector.

The PCIe protocol defines various message types that may be sent and received across a PCIe-compliant bus. One such message type is an interrupt. An interrupt signal is provided to a host, and the host must ascertain if a source of the interrupt signal is authorized to request the interrupt. Currently, a root complex in the host strips an identifier from a header of the interrupt signal and provides the identifier to a memory management unit using a separate signal in a side channel. The identifier is also routed in the system to an interrupt controller in the side channel. Use of such side channels may increase power consumption as well as require additional conductive elements. Accordingly, there is a need to reduce reliance on the side channel to provide such source identifiers. In addition to the identifier, other messages containing different information may be sent on side channels and the need to reduce reliance on such side channels is applicable to these other messages as well.

SUMMARY OF THE DISCLOSURE

Aspects disclosed in the detailed description include extended message signaled interrupts (MSI) message data. Exemplary aspects of the present disclosure contemplate using the extended MSI message data for additional information that assists in processing interrupts by replacing unused bits in the extended MSI message data with meaningful data. In one exemplary aspect, MSI bits are modified to include the additional information, which may be a system level identifier (which may be referred to sometimes as a source identifier). In an exemplary aspect, an upper sixteen bits of the extended MSI message data are modified to contain the additional information, which may include the system level identifier, whose size may be less than the full sixteen bits, but may be up to the full sixteen bits. By providing the system level identifier within the extended MSI message data, an interrupt controller can verify an interrupt source. Other exemplary aspects may provide interrupt priority information or interrupt moderation information in the extended MSI message data. By providing the additional extended MSI message data in a body of historically unused MSI bits, the need for side channels may be reduced, which simplifies wiring and reduces power consumption.

In this regard, in one aspect, a method of passing information in a Peripheral Component Interconnect (PCI) express (PCIe) system is disclosed. The method includes receiving at a host a signal. The signal includes a header. The signal also includes a body. The body includes extended MSI message data in at least one of a first sixteen bits from a PCIe endpoint. The method also includes extracting, at a root complex of the host, the body from the signal to form an MSI vector with the extended MSI message data still in the body of the MSI vector. The method also includes passing over a System Network on a Chip (SNoC) the MSI vector to an interrupt controller in the host with the extended MSI message data still in the body of the MSI vector.

In another aspect, a method of passing information in PCIe system is disclosed. The method includes generating at a slave in a PCIe system, a signal. The signal includes a header. The signal also includes a body. The body includes extended MSI message data in at least one of a first sixteen bits. The method also includes sending the signal to a host of the PCIe system.

In another aspect, a host in a PCIe system is disclosed. The host includes a SNoC bus. The host also includes a PCIe bus interface. The PCIe bus interface is configured to be coupled to a PCIe bus. The PCIe bus interface is further configured to receive a signal having extended MSI message data from the PCIe bus. The host also includes an interrupt controller coupled to the SNoC bus. The host also includes a memory management unit coupled to the SNoC bus. The host also includes a root complex coupled to the PCIe bus interface and the memory management unit. The root complex is configured to extract a body from the signal to form an MSI vector with the extended MSI message data still in the body of the MSI vector and pass the MSI vector to the interrupt controller with the extended MSI message data still in the body of the MSI vector through the memory management unit and the SNoC bus.

In another aspect, a slave in a PCIe system is disclosed. The slave includes a PCIe bus interface configured to be coupled to a PCIe bus. The slave also includes a capability register. The capability register includes information indicating that a slave can use extended MSI message data. The slave also includes a control system. The control system is configured to detect an interrupt need condition. The control system is also configured to assemble a signal including a header and a body including the extended MSI message data. The control system is also configured to send the signal to a host over the PCIe bus.

In another aspect, a PCIe system is disclosed. The PCIe system includes a PCIe bus. The PCIe system also includes a PCIe slave. The PCIe slave includes a slave PCIe bus interface coupled to the PCIe bus. The PCIe slave also includes a slave control system. The slave control system is configured to detect an interrupt need condition. The slave control system is also configured to assemble a signal including a header and body including extended MSI message data. The slave control system is also configured to send the signal to a host over the PCIe bus. The PCIe system also includes the host. The host includes a SNoC bus. The host also includes a host PCIe bus interface coupled to the PCIe bus. The host PCIe bus interface is further configured to receive the signal. The host also includes an interrupt controller coupled to the SNoC bus. The host also includes a root complex coupled to the host PCIe bus interface. The root complex is configured to extract the body from the signal to form an MSI vector with the extended MSI message data still in the body of the MSI vector and pass the MSI vector to the interrupt controller with the extended MSI message data still in the body of the MSI vector through the SNoC bus.

In another aspect, a method of identifying a signal source in a PCIe system is disclosed. The method includes receiving at a host a signal having a requester identifier in a header and a source identifier in a body from a PCIe endpoint. The method also includes at a root complex of the host, removing the requester identifier. The method also includes extracting the body to form an MSI vector with the source identifier still in the body of the MSI vector. The method also includes passing over a SNoC the MSI vector to an interrupt controller in the host with the source identifier still in the body of the MSI vector.

In another aspect, a method of identifying a signal source in a PCIe system is disclosed. The method includes generating at a slave in a PCIe system, a signal. The signal includes a header including a requester identifier. The signal also includes a body including a source identifier. The method also includes sending the signal to a host of the PCIe system.

In another aspect, a host is disclosed. The host includes a bus interface configured to be coupled to a PCIe bus. The host also includes a root complex coupled to the bus interface. The root complex is configured to receive a signal containing a requester identifier in a header of the signal and a source identifier from the bus interface. The root complex is also configured to remove the header from the signal. The root complex is also configured to send an MSI vector to an interrupt controller containing a body of the signal including the source identifier in a body of the MSI vector. The interrupt controller is configured to receive the MSI vector containing the source identifier in the body of the MSI vector.

In another aspect, a slave in a PCIe system is disclosed. The slave includes a PCIe bus interface configured to be coupled to a PCIe bus. The slave also includes a capability register including information indicating that a slave can use a source identifier in a body of an interrupt signal. The slave also includes a control system. The control system is configured to detect an interrupt need condition. The control system is also configured to assemble a signal including a header including a requester identifier and a body including the source identifier. The control system is also configured to send the signal to a host over the PCIe bus.

In another aspect, a method of identifying a signal source is disclosed. The method includes receiving at a host a signal having a requester identifier in a header and a system level identifier in a body from a PCIe endpoint. The method also includes, at a root complex of the host, removing the requester identifier. The method also includes extracting a body to form an MSI vector with the system level identifier still in the body of the MSI vector. The method also includes passing over a SNoC the MSI vector to an interrupt controller in the host with the system level identifier still in the body of the MSI vector.

DETAILED DESCRIPTION

Figure 1:
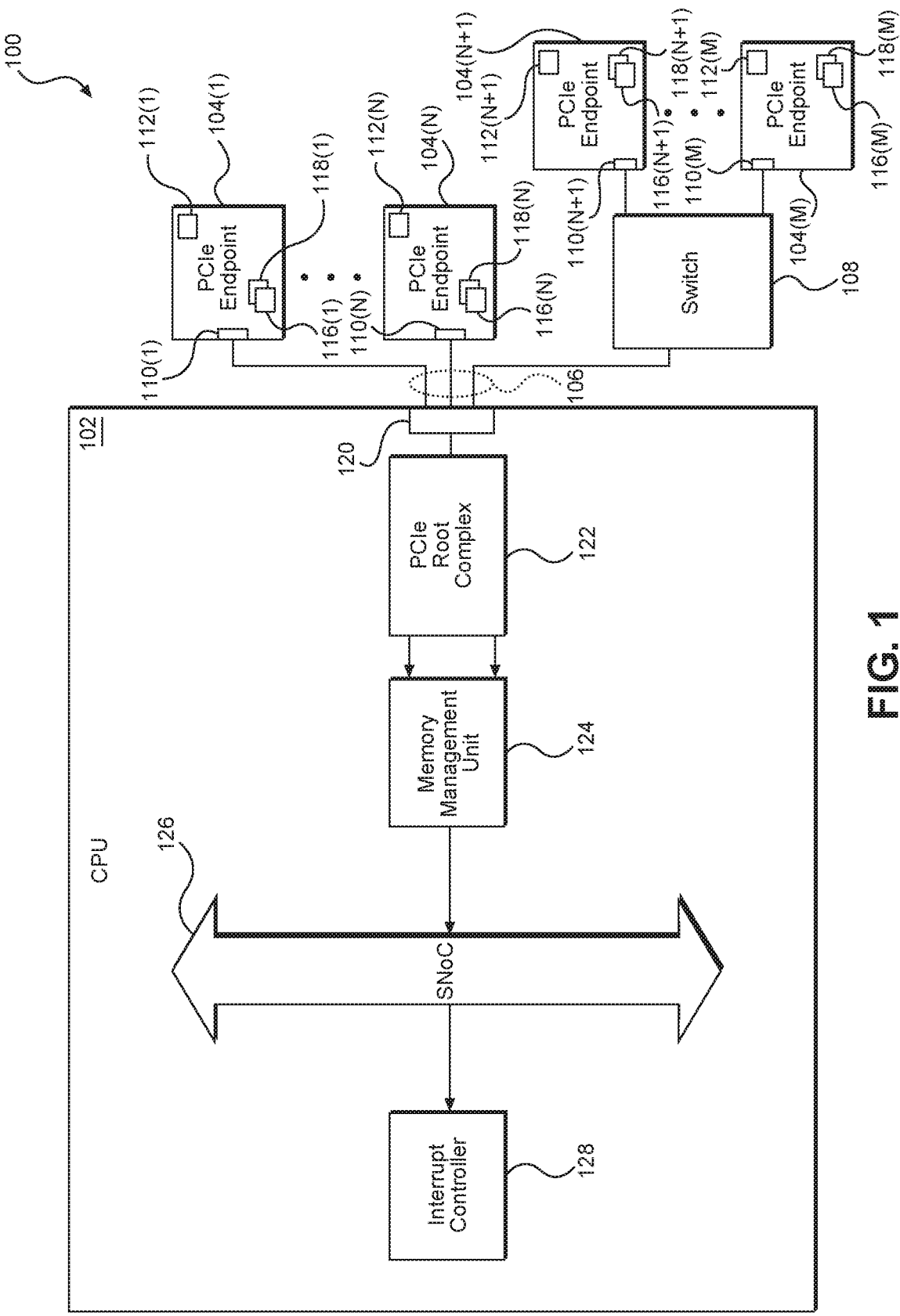
FIG. 1 is a block diagram of an exemplary Peripheral Component Interconnect (PCI) express (PCIe) system with aspects of a central processing unit (CPU) further illustrated.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include extended message signaled interrupts (MSI) message data. Exemplary aspects of the present disclosure contemplate using the extended MSI message data for additional information that assists in processing interrupts by replacing unused bits in the extended MSI message data with meaningful data. In one exemplary aspect, MSI bits are modified to include the additional information, which may be a system level identifier (which may be referred to sometimes as a source identifier). In an exemplary aspect, an upper sixteen bits of the extended MSI message data are modified to contain the additional information, which may include the system level identifier, whose size may be less than the full sixteen bits, but may be up to the full sixteen bits. By providing the system level identifier within the extended MSI message data, an interrupt controller can verify an interrupt source. Other exemplary aspects may provide interrupt priority information or interrupt moderation information in the extended MSI message data. By providing the additional extended MSI message data in a body of historically unused MSI bits, the need for side channels may be reduced, which simplifies wiring and reduces power consumption.

In this regard, FIG. 1 is a block diagram of an exemplary Peripheral Component Interconnect (PCI) express (PCIe) system 100 configured to support exchange of extended MSI message data within a body of a signal for extraction and use in an MSI vector. In particular, FIG. 1 illustrates the PCIe system 100, which includes a host 102, which may be a central processing unit (CPU), a system on a chip (SoC), or the like. The host 102 is coupled to PCIe endpoints 104(1)-104(M) through a PCIe bus 106. It should be appreciated that the PCIe protocol calls for a point to point connection between host and endpoints, and thus, each connection may be considered its own bus. However, for the sake of convenience, the plurality of connections is termed the PCIe bus 106 herein. Further, point to multi-point capability may be achieved through use of a hub or switch 108. As illustrated, PCIe endpoints 104(1)-104(N) are connected by point to point connections within the PCIe bus 106, and PCIe endpoints 104(N+1)-104(M) are coupled to the switch 108. It should be appreciated that the PCIe system 100 may include multiple switches (not illustrated) or no switches (also not illustrated) without departing from the scope of the present disclosure. Likewise, the number of endpoints coupled to any switch may vary without departing from the scope of the present disclosure. Each of the PCIe endpoints 104(1)-104(M) may also be considered a slave relative to the host 102.

With continued reference to FIG. 1, each PCIe endpoint 104(1)-104(M) includes a respective slave PCIe bus interface 110(1)-110(M) that is configured to couple to the PCIe bus 106. Further, each PCIe endpoint 104(1)-104(M) may include a control system 112(1)-112(M). The control system 112(1)-112(M) may interoperate with a corresponding capability register 116(1)-116(M). Capability identifiers may be stored therein, each capability having a unique capability identifier, which may be read by the host 12. While described as unitary capability registers, it should be appreciated that the present disclosure also contemplates banks of capability registers, each register representing a different capability or subsets of a total number of capabilities without departing from the scope of the present disclosure. The general concept of capability registers is well documented in the PCIe standard. Exemplary aspects of the present disclosure add a new capability register as outlined below. Additionally, each PCIe endpoint 104(1)-104(M) may have a corresponding configuration register 118(1)-118(M).

With continued reference to FIG. 1, the host 102 may include a bus interface 120, which allows signals to be transmitted onto or received from the PCIe bus 106. Note that given the point to point nature of the PCIe protocol, the bus interface 120 may include a plurality of point to point interfaces. However, such individual interfaces are not shown for simplicity. The host 102 further includes a PCIe root complex 122 that communicates with a memory management unit 124. The memory management unit 124 is coupled to a System Network on a Chip (SNoC) 126, which acts as an internal bus for the host 102. In particular, the memory management unit 124 may communicate with an interrupt controller 128 through the SNoC 126.

Figure 2:
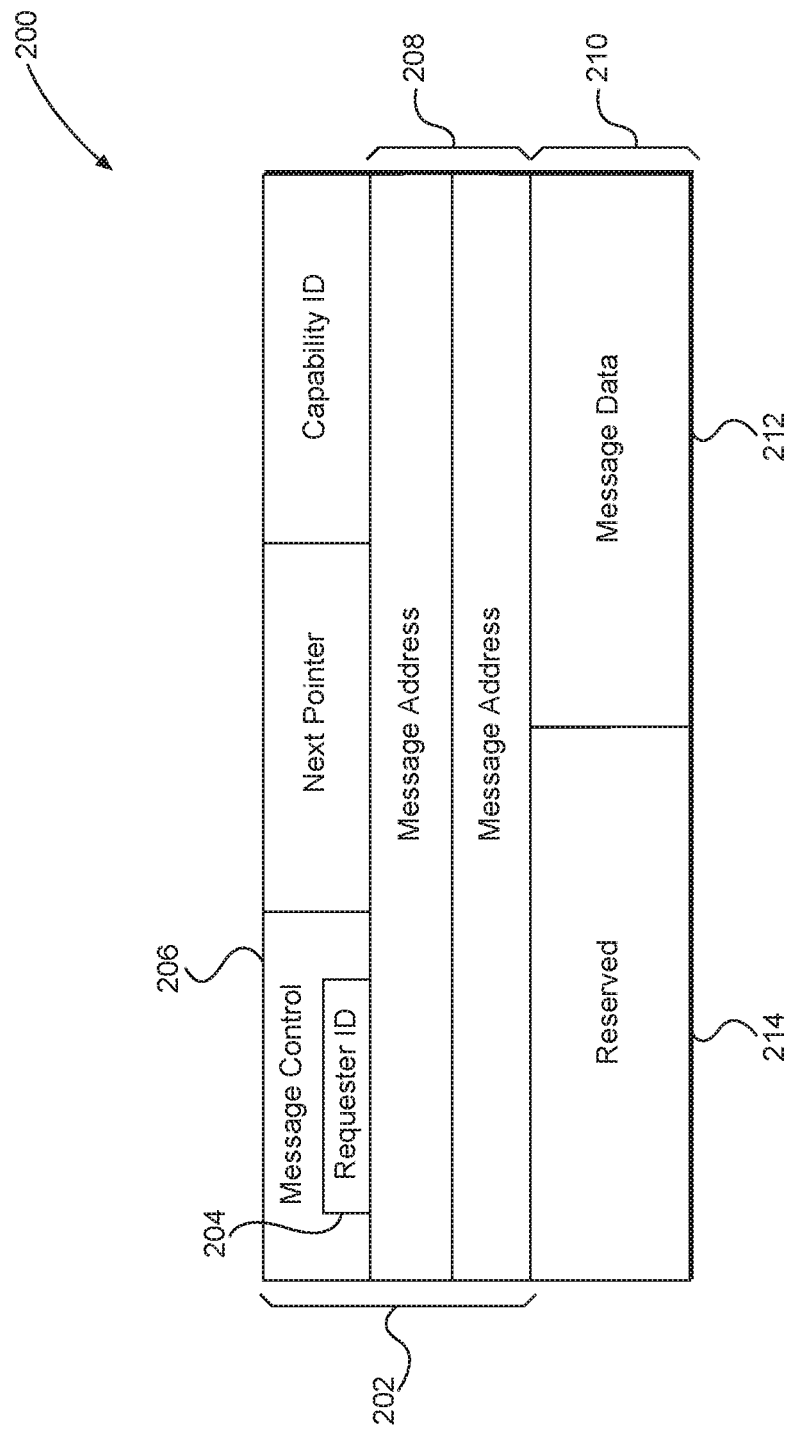
FIG. 2 illustrates a conventional message signaled interrupt (MSI) signal or packet that is sent from a PCIe endpoint to a PCIe host.

In conventional systems, if a PCIe endpoint generates an interrupt, the PCIe endpoint generates an MSI packet or signal 200 as illustrated in FIG. 2 and sends the MSI signal 200 to the PCIe root complex over the PCIe bus. The MSI signal 200 has a header 202 with a requester identifier 204 (referenced in drawings as requester ID) in a message control field 206 in the header 202. The MSI signal 200 further has a destination address 208 in the header 202 and a body 210. MSI message data 212 is contained in a final sixteen bits of the body 210. For conventional systems, a first sixteen bits 214 of the body 210 are reserved and not used. With continued reference to a conventional system, the PCIe root complex removes the header 202 from the MSI signal 200 and passes the interrupt to the memory management unit with the requester identifier 204 being provided through a separate signal in a side channel. The memory management unit in turn passes the interrupt to the interrupt controller over the SNoC maintaining the requester identification on a side channel Additional information, such as interrupt priorities and interrupt moderation, may likewise be included in the header 202, but also may be stripped out by the PCIe root complex and sent to the interrupt controller through a side band. The use of such side channels may require extra wiring, increase power consumption as an additional channel must be driven, and otherwise be undesirable.

Figure 3:
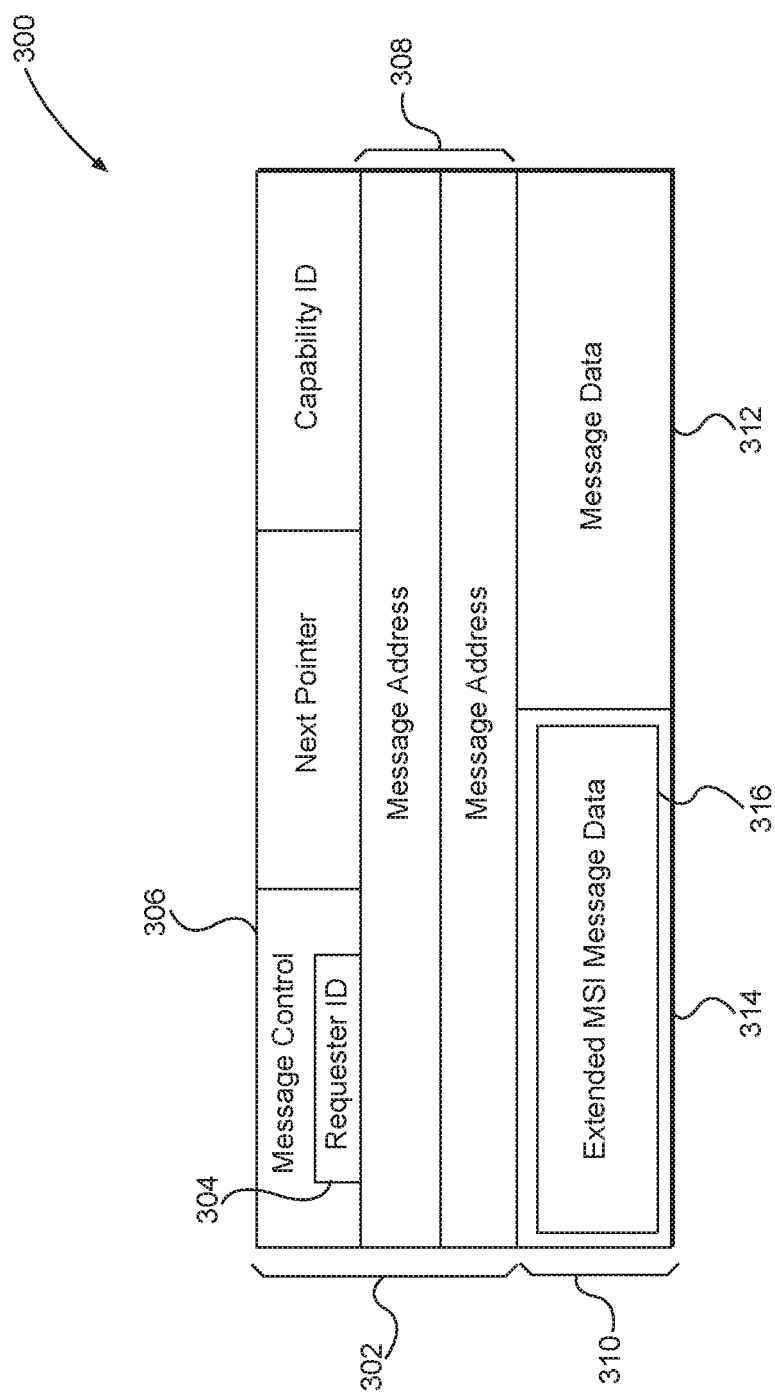
FIG. 3 illustrates an MSI signal or packet according to an exemplary aspect of the present disclosure with extended MSI message data in a body of the MSI signal.

Exemplary aspects of the present disclosure eliminate the need for the side channel by including extended MSI message data in the body of the MSI signal. An exemplary MSI packet or signal 300 according to an exemplary aspect of the present disclosure is provided with reference to FIG. 3. As with the MSI signal 200 of FIG. 2, the MSI signal 300 includes a header 302 with a requester identifier 304 (referenced in drawings as requester ID) in a message control field 306 in the header 302. The MSI signal 300 further has a destination address 308 in the header 302 and a body 310. MSI message data 312 is contained in a final sixteen bits of the body 310. A first sixteen bits 314 of the body 310 are used to hold extended MSI message data 316. In an exemplary aspect, the extended MSI message data 316 may be a source identifier or a system level identifier. Note that the system level identifier does not have to be the same as a device identifier, and in exemplary aspects, multiple devices may have the same system level identifier. In an exemplary aspect, the system level identifier may be created by one of the PCIe endpoints 104(1)-104(M) of FIG. 1 by using its corresponding configuration register 118(1)-118(M). The content of this configuration register 118(1)-118(M) may be set by software running on the host 102. Alternatively, the system level identifier may be the same as the requester identifier 304 provided by a PCIe enumeration process. In other exemplary aspects, the extended MSI message data may be interrupt priority information or interrupt moderation information. In still another exemplary aspect, the extended MSI message data may be additional data that would otherwise be put in the MSI message data 312. The extended MSI message data may then be preserved in the body of an MSI vector passed to the interrupt controller 128 without the need for the side channels.

While it is particularly contemplated that the first sixteen bits 314 of the body 310 may be used to provide the system level identifier, the present disclosure is not so limited. In this regard, as alluded to above, the body 310 may carry extended message data such as the interrupt priority information, the interrupt moderation information (which may be used to aggregate a predetermined number of interrupts before executing an interrupt), or the like. Further, while it is contemplated that the system level identifier may use all sixteen bits of the first sixteen bits 314, the present disclosure is not so limited. That is, fewer than sixteen bits may be used for the system level identifier, and any remaining bits may be used to carry other information such as the interrupt priority information, the interrupt moderation information, or the like. In still another aspect, the MSI message data 312, which is normally only sixteen bits, may be expanded to use the full thirty-two bits of the body 310.

Figure 4:
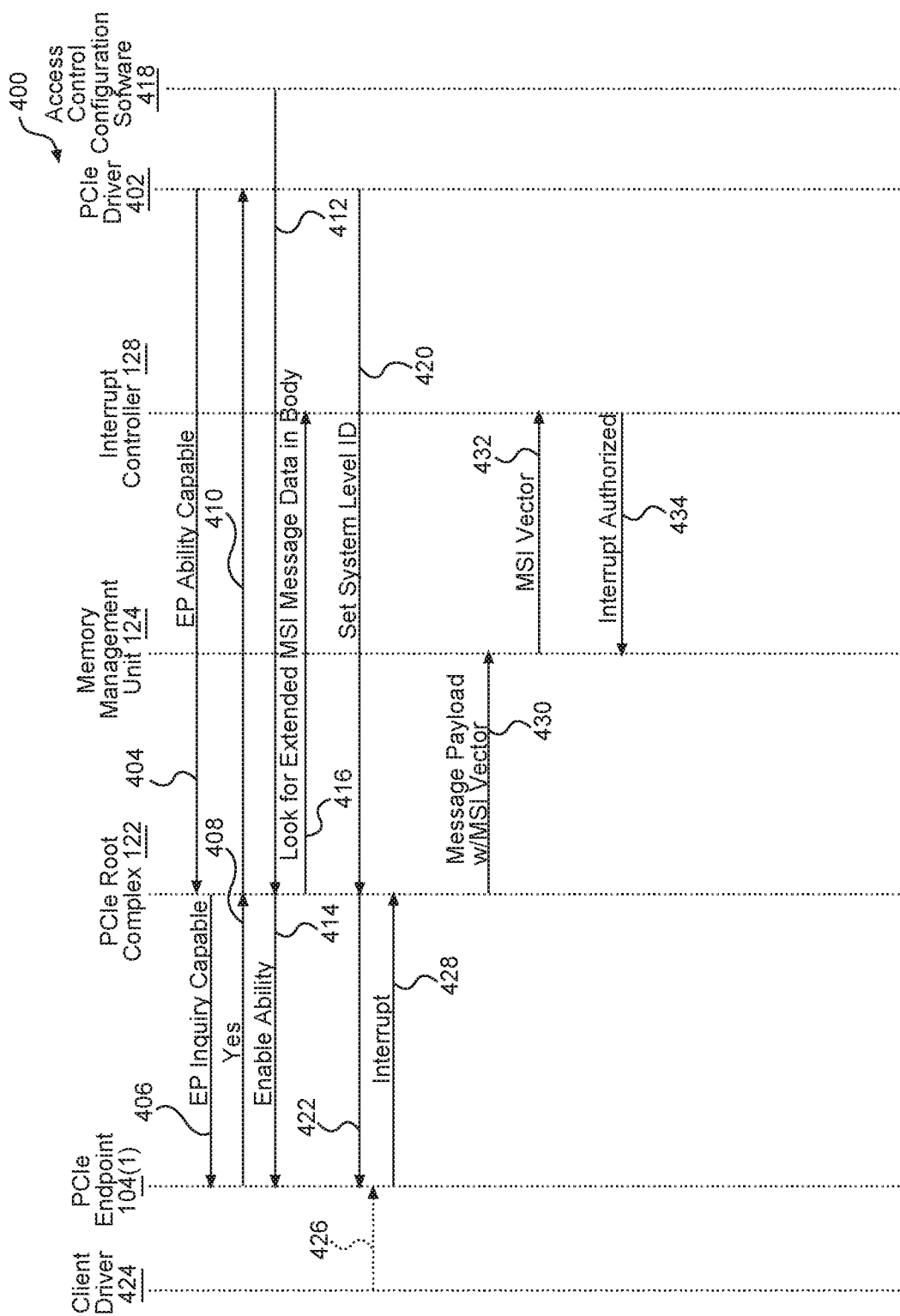
FIG. 4 illustrates an exemplary signal message flow diagram between the elements of FIG. 1.

FIG. 4 illustrates a signal message flow diagram 400 between the elements of FIG. 1. For the sake of example, PCIe endpoint 104(1) is used, although it should be appreciated that any of the other PCIe endpoints 104(2)-104(M) could also operate in similar fashion. The host 102 may have a PCIe driver 402 in the form of software running on a processor that initiates certain operations of the process associated with the signal message flow diagram 400. In this regard, after enumeration (not illustrated), the PCIe driver 402 may cause the PCIe root complex 122 to initiate a capability inquiry by sending endpoint (EP) ability capable signal 404. Then, the PCIe root complex 122 may send an EP inquiry capable message 406 to the PCIe endpoint 104(1). This EP inquiry capable message 406 may cause capability register 116(1) to be read. The PCIe endpoint 104(1) sends back an affirmative signal 408 indicating that the PCIe endpoint 104(1) is capable of using extended MSI message data. Based on the affirmative signal 408, the PCIe root complex 122 may pass a continued affirmative signal 410 to the PCIe driver 402. The PCIe driver 402 may then generate an enable ability signal 412 that is sent to the PCIe root complex 122. The PCIe root complex 122 then sends an enable ability command 414 to the PCIe endpoint 104(1) that instructs the PCIe endpoint 104(1) to use the extended MSI message data in the body 310 of the MSI signal 300. The PCIe root complex 122 also sends a command 416 to the interrupt controller 128 to configure the interrupt controller 128 to look for the extended MSI message data in the body of any MSI vector that the interrupt controller 128 receives. Where the extended MSI message data is a system level identifier, software, such as access control configuration software 418 resident in the memory management unit 124, may command that a write command be sent to the appropriate configuration registers 118(1)-118(M) to set the system level identifier through signal 420. While exemplary non-limiting aspects of the present disclosure provide the access control configuration software 418 in the memory management unit 124, the access control configuration software 418 may likewise be present in a processor or controller in the host 102. However, the present disclosure is not so limited, and this function may be implemented in firmware in the host 102. Further, while a processor or controller within the host 102 is one location for the access control configuration software 418, it should be appreciated that the functions of the access control configuration software 418 may be performed outside the host 102.

With continued reference to FIG. 4, the signal 420 causes the PCIe root complex 122 to send a set system level identifier signal 422 to the PCIe endpoint 104(1), which sets the system level identifier in the configuration register 118(1). A client driver 424, which may be a PCIe driver within the host 102, sets the message data into the appropriate register in the PCIe endpoint 104(1) through signal 426. In an exemplary non-limiting aspect, the client driver 424 may run on any processor or controller in the host 102 or may be positioned outside the host 102 as needed or desired.

With continued reference to FIG. 4, the PCIe endpoint 104(1) generates an interrupt signal 428 and sends the interrupt signal 428 to the PCIe root complex 122 over the PCIe bus 106. The PCIe root complex 122 then passes a message payload with an MSI vector 430 to the memory management unit 124. The memory management unit 124 then uses the SNoC 126 to pass an MSI vector 432 with the extended MSI message data in the body of the MSI vector 432 to the interrupt controller 128. The interrupt controller 128 then parses the MSI vector 432 and extracts the extended MSI message data, which may, for example, be the system level identifier. In the event that the extended MSI message data is the system level identifier, the extracted system level identifier is compared to entities authorized to request interrupts (for example, with a look-up table (not illustrated) or the like), and, if the system level identifier is authorized, the interrupt controller 128 sends an interrupt authorized signal 434 to the memory management unit 124 for interrupt execution. If the extended MSI message data includes data other than the system level identifier, the additional data is likewise within the body of the MSI vector 432 and used appropriately after extraction from the MSI vector 432.

Figure 5:
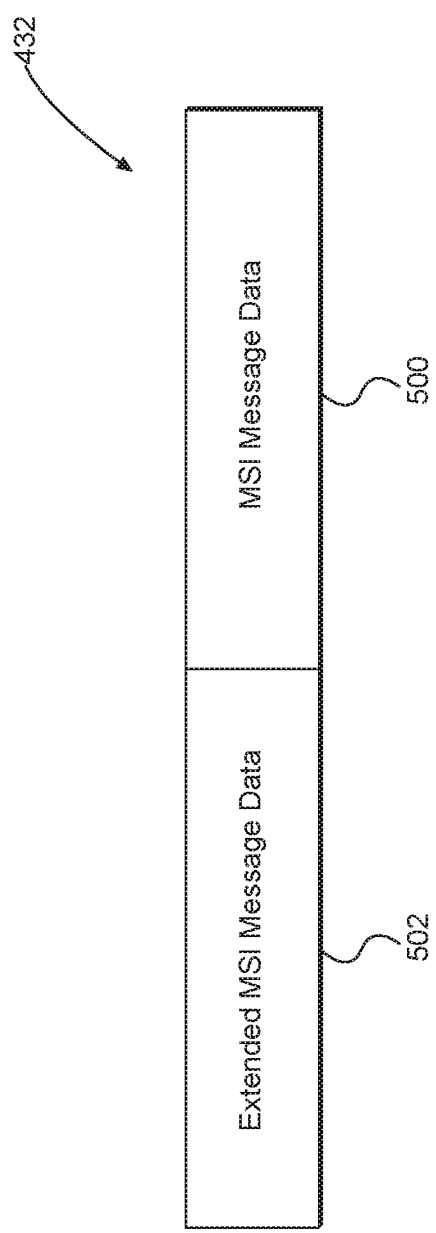
FIG. 5 illustrates an exemplary System Network on Chip (SNoC) packet or MSI vector that may be sent from a root complex in a host to an interrupt controller in the host with extended MSI message data therein according to exemplary aspects of the present disclosure.

The MSI vector 432 contains MSI message data 500 and extended MSI message data 502 as illustrated in FIG. 5. In an exemplary aspect, the MSI message data 500 is in the final sixteen bits of the MSI vector 432 and the extended MSI message data 502 is in the first sixteen bits. As noted above, the extended MSI message data 502 may be the system level identifier, the interrupt priority information, the interrupt moderation information, additional MSI data, or the like. Further, while sixteen bits are available for the extended MSI message data 502, use of less than all sixteen bits is still within the scope of the present disclosure.

Figure 6:
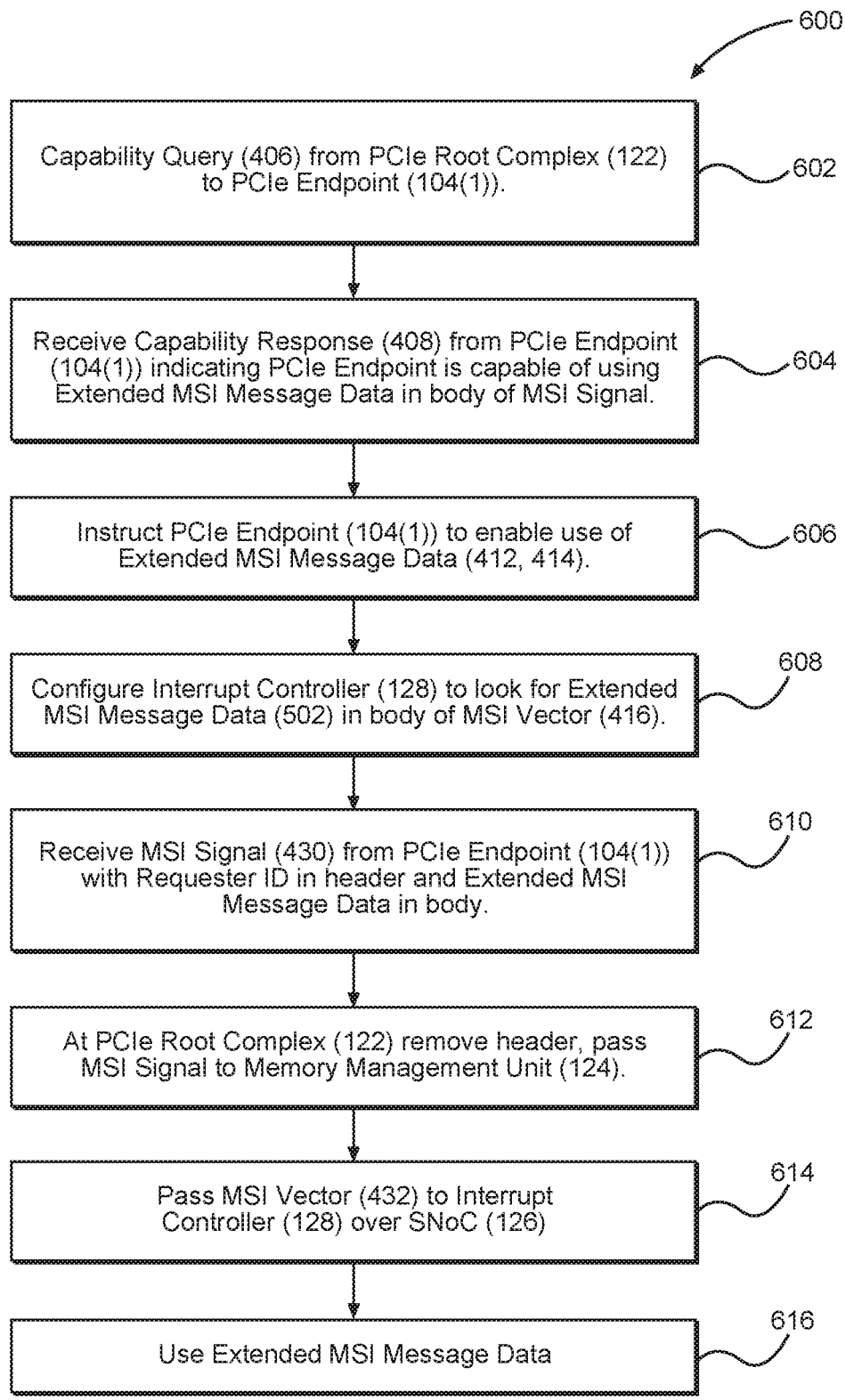
FIG. 6 is a flowchart illustrating an exemplary method associated with the PCIe system of FIG. 1.

A flowchart of an exemplary process substantially similar to the signal message flow diagram 400 of FIG. 4 is provided in FIG. 6. In this regard, process 600 presents a system level flowchart. The process 600 begins with the PCIe root complex 122 sending a capability query to the PCIe endpoint 104(1) (block 602) (e.g., the EP inquiry capable message 406). The PCIe root complex 122 receives a capability response (e.g., the affirmative signal 408) from the PCIe endpoint 104(1) indicating that the PCIe endpoint 104(1) is capable of using the extended MSI message data (e.g., the system level identifier) in the body 310 of the MSI signal 300 (block 604). The PCIe root complex 122 instructs the PCIe endpoint 104(1) to enable use of the extended MSI message data (block 606) (e.g., the enable ability command 414). The PCIe root complex 122 further configures the interrupt controller 128 to look for the extended MSI message data 502 in the body of the MSI vector (block 608) (e.g., the command 416).

With continued reference to FIG. 6, the PCIe endpoint 104(1) generates the interrupt signal 428 with the requester identifier 304 in the header 302 and the extended MSI message data 316 in the body 310 of the MSI signal, which is received at the PCIe root complex 122 (block 610). At the PCIe root complex 122, the PCIe root complex 122 removes the header 302 and passes the interrupt to the memory management unit 124 (block 612) (e.g., the MSI vector 432). The memory management unit 124 passes the MSI vector 432 to the interrupt controller 128 over the SNoC 126 (block 614). The interrupt controller 128 uses the extended MSI message data as indicated, which, if the extended MSI message data is a system level identifier, the interrupt controller 128 verifies the interrupt based on the system level identifier (block 616). Once the interrupt controller 128 verifies that the requesting entity is allowed to interrupt the host, the interrupt controller 128 takes the appropriate interrupt action(s).

Figure 7:
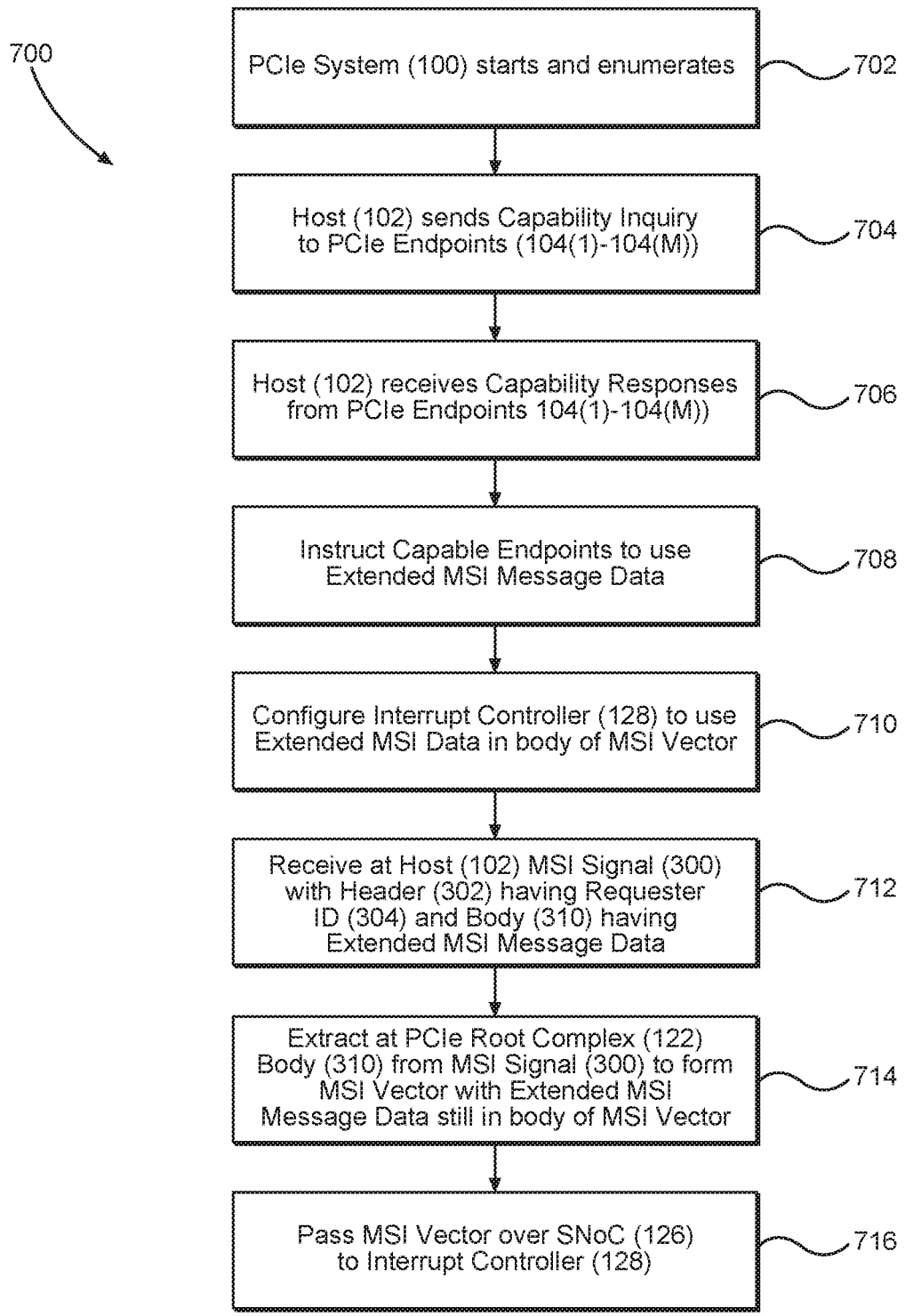
FIG. 7 is a flowchart illustrating a process of exchanging extended MSI message data according to an exemplary aspect from a host side perspective.
Figure 8:
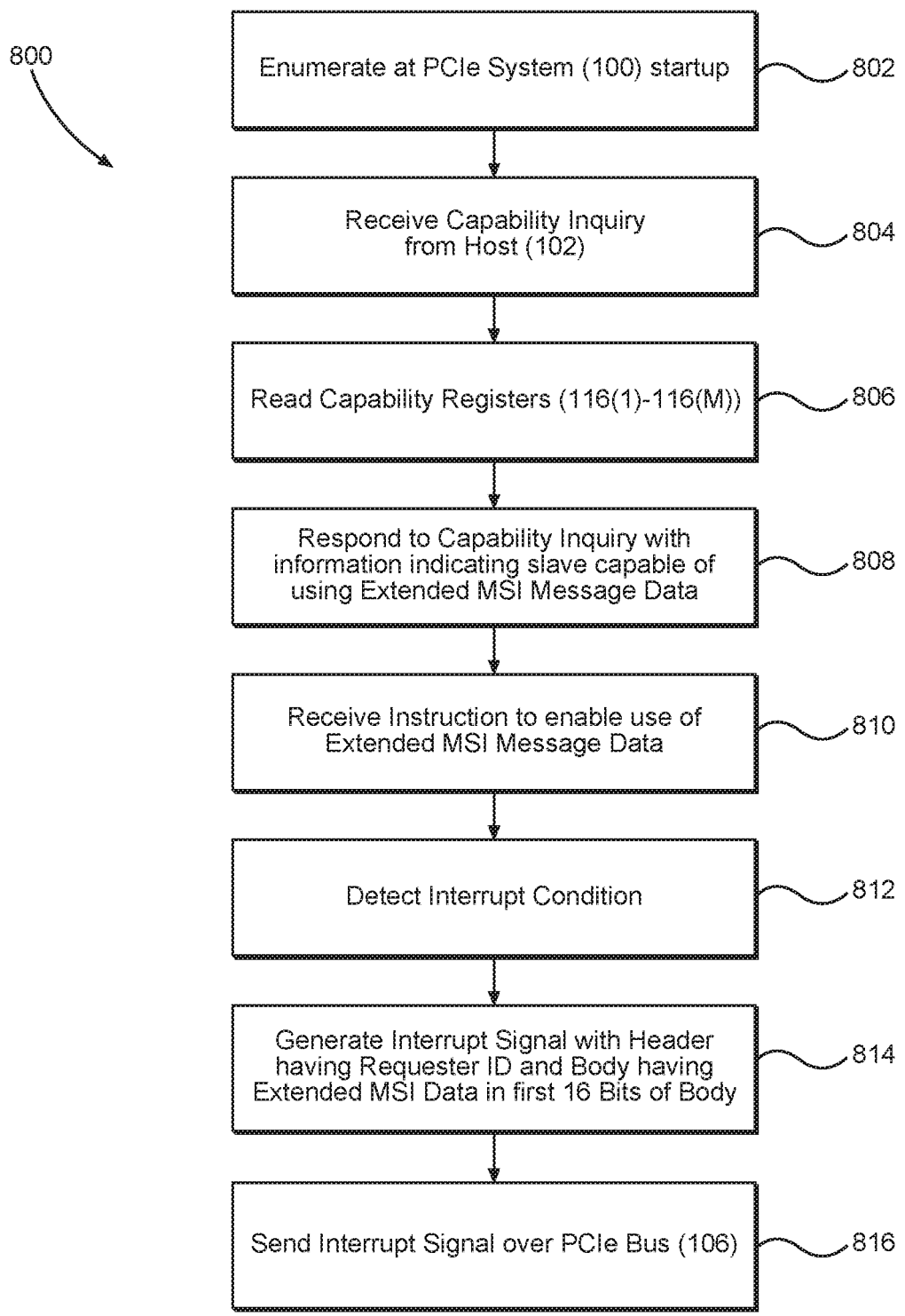
FIG. 8 is a flowchart illustrating a process of exchanging message data according to an exemplary aspect from a slave side perspective.

While the process 600 of FIG. 6 illustrates an exemplary process of the present disclosure, FIGS. 7 and 8 provide host and slave point of view flowcharts respectively. In this regard, FIG. 7 illustrates process 700. The process 700 begins when the PCIe system 100 of FIG. 1 starts and enumerates elements within the PCIe system 100 (block 702). The enumeration process is well documented in the PCIe protocol and is not further discussed. The host 102 sends a capability inquiry to each of the PCIe endpoints 104(1)-104(M) (block 704). The host 102 receives capability responses from the PCIe endpoints 104(1)-104(M) (block 706). Based on the capability responses received, the host 102 instructs capable endpoints of the PCIe endpoints 104(1)-104(M) to use extended MSI message data (block 708). Note that at this point, the PCIe driver 402 and the client driver 424 may populate extended message data registers and message data registers (note that these may be within the configuration registers 118(1)-118(M)) within the PCIe endpoints 104(1)-104(M). In an exemplary aspect, the extended message data register is populated with a system level identifier or a source identifier. As discussed above, this may be the same as or different than the identifier created during enumeration.

With continued reference to FIG. 7, the host 102 also configures the interrupt controller 128 to use the extended MSI data in the body of the MSI vector (block 710). At some subsequent time, the host 102 will receive the MSI signal 300 with the header 302 having the requester identifier 304 and the body 310 having the extended MSI message data therein (block 712) over the PCIe bus 106. The PCIe root complex 122 extracts the body 310 from the MSI signal 300 to form an MSI vector with the extended MSI message data still in the body of the MSI vector (block 714). The MSI vector is then passed over the SNoC 126 to the interrupt controller 128 (block 716).

Similarly, FIG. 8 illustrates a process 800 from the slave point of view. The process 800 begins with enumeration at the startup of the PCIe system 100 (block 802). After enumeration, the slave receives a capability inquiry from the host 102 (block 804). The slave reads the appropriate capability register 116(1)-116(M) (block 806) and responds to the capability inquiry with information indicating the slave is capable of using the extended MSI message data (block 808). The slave receives instructions to enable the use of extended MSI message data (block 810) (e.g., signal 414).

With continued reference to FIG. 8, at some subsequent time, the slave detects an interrupt condition (block 812) and generates an interrupt signal with a header having a requester identifier and a body having the extended MSI message data in the first sixteen bits of the body (block 814). The slave then sends the interrupt signal to the host 102 over the PCIe bus 106 (block 816).

By using the capability inquiry in the various processes 600, 700, and 800, backwards compatibility may be maintained in that absent an affirmative response (such as occurs when a legacy component is queried), the ability is not enabled, and the extended MSI message data is not placed in the first sixteen bits of the MSI vector.

Figure 9:
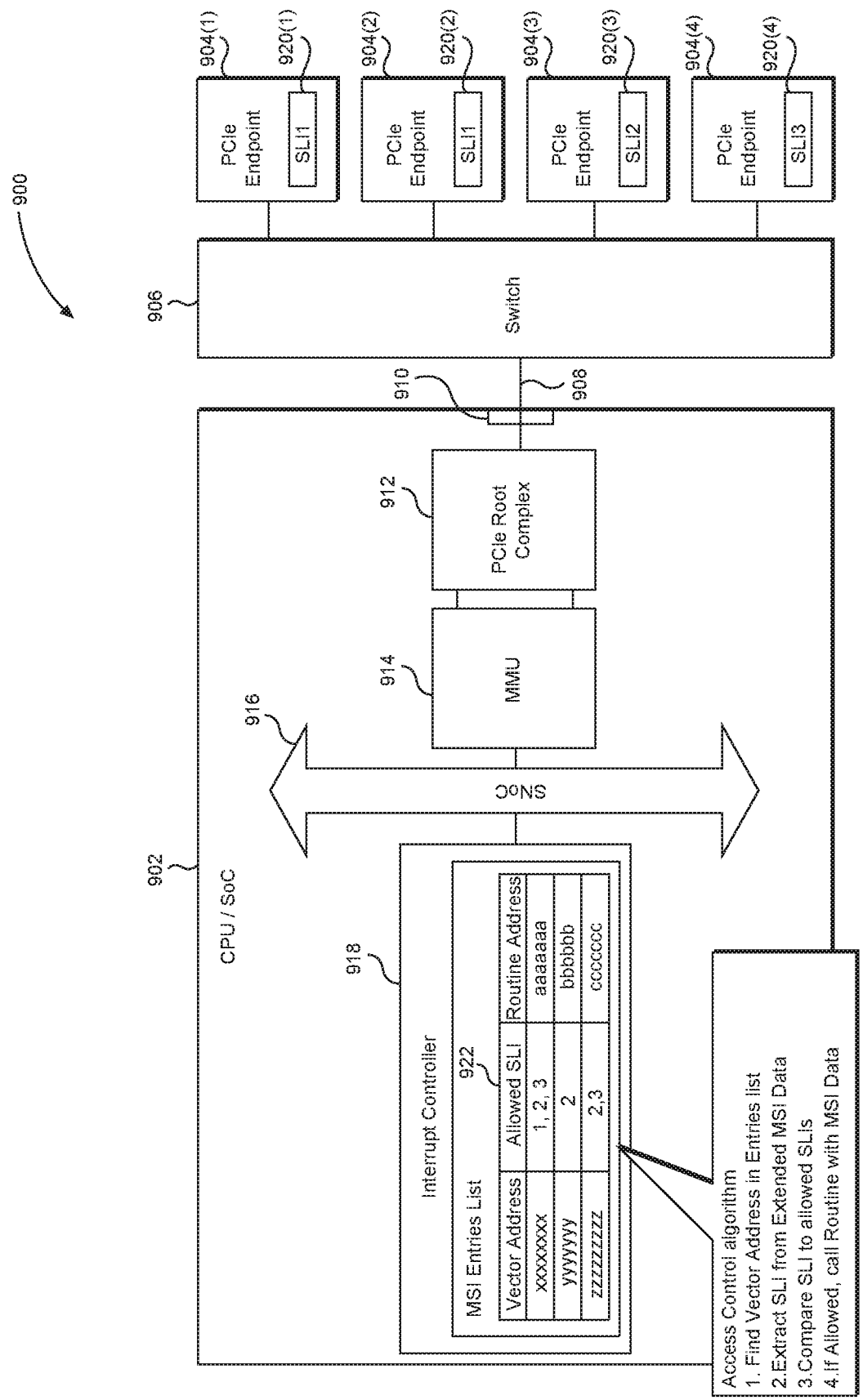
FIG. 9 illustrates a simplified block diagram of a system where multiple endpoints share a single system level identifier.

As alluded to above, multiple endpoints may have the same system level identifier. In this regard, FIG. 9 illustrates a block diagram of an exemplary PCIe system 900. The PCIe system 900 includes a host 902, which may be a CPU or other SoC. The PCIe system 900 further includes PCIe endpoints 904(1)-904(4). The host 902 is coupled to a switch 906 through a PCIe bus 908. Note that the PCIe endpoints 904(1)-904(4) are coupled to the PCIe bus 908 through the switch 906.

With continued reference to FIG. 9, the host 902 may include a bus interface 910, which allows signals to be transmitted onto or received from the PCIe bus 908. The host 902 further includes a PCIe root complex 912 that communicates with a memory management unit (referenced in drawings as MMU) 914. The memory management unit 914 is coupled to a SNoC 916, which acts as an internal bus for the host 902. In particular, the memory management unit 914 may communicate with an interrupt controller 918 through the SNoC 916.

With continued reference to FIG. 9, PCIe endpoints 904(1) and 904(2) have the same system level identifier (SLI1) associated therewith. That is, the access control configuration software 418 has programmed respective configuration registers 920(1) and 920(2) with the same system level identifier. PCIe endpoint 904(3) has a second system level identifier (SLI2) in its configuration register 920(3), and PCIe endpoint 904(4) has a third system level identifier (SLI3) in its respective configuration register 920(4).

With continued reference to FIG. 9, the interrupt controller 918 has an MSI entries list 922 which may be programmed with which system level identifiers are allowed to perform which interrupts. Thus, extending on the concept introduced in block 616 of FIG. 6, the interrupt controller 918 receives the MSI vector address and extracts the system level identifier from the extended MSI message data. Using the MSI vector address, the interrupt controller 918 compares the extracted system level identifier to allowed system level identifiers in the MSI entries list 922, and, if there is a match, then the interrupt controller 918 acts on the regular MSI data within the interrupt request.

The extended MSI message data according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a smart phone, a tablet, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, an automobile, and a portable digital video player.

Figure 10:
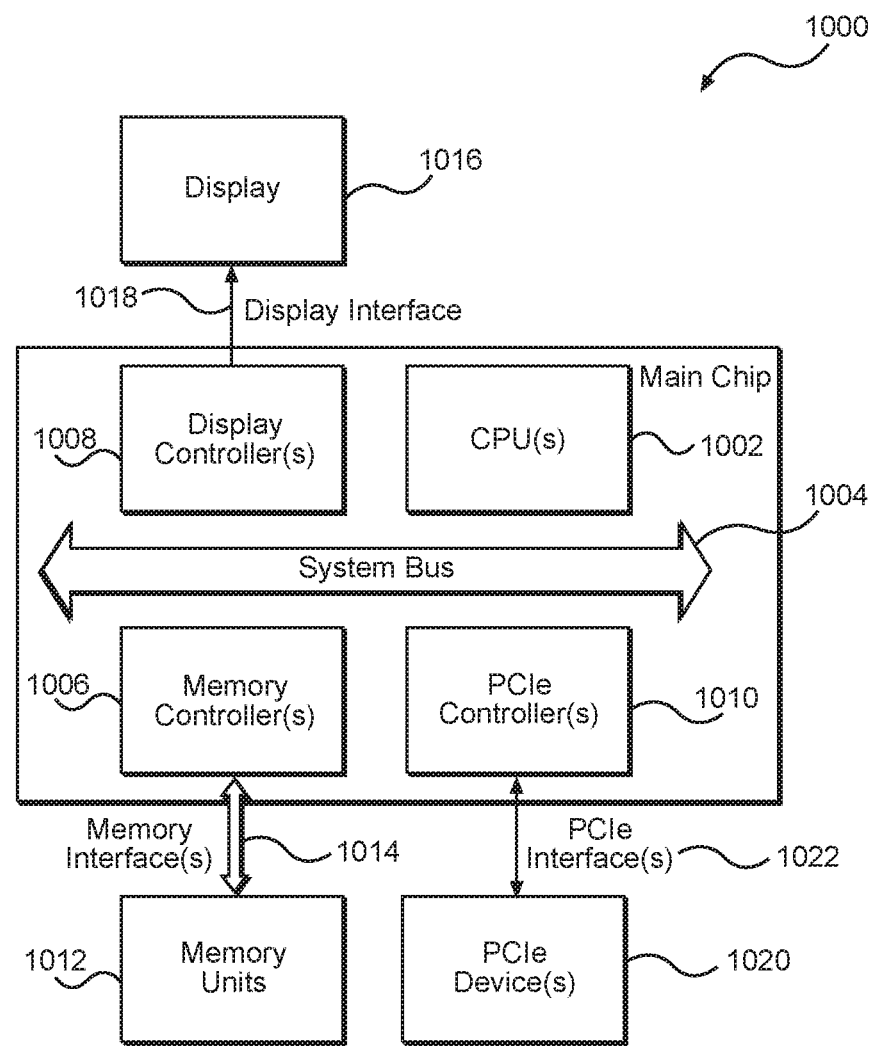
FIG. 10 is a block diagram of an exemplary processor-based system that can include the PCIe system of FIG. 1.

In this regard, FIG. 10 illustrates an example of a processor-based system 1000 that can employ the PCIe system 100 illustrated in FIG. 1. In this example, the processor-based system 1000 includes one or more central processing units (CPUs) 1002, each including one or more processors (not illustrated). The CPU(s) 1002 may have cache memory (not illustrated) coupled to the processor(s) (not illustrated) for rapid access to temporarily stored data. The CPU(s) 1002 is coupled to a system bus 1004. As is well known, the CPU(s) 1002 communicates with other devices by exchanging address, control, and data information over the system bus 1004. For example, the CPU(s) 1002 can communicate bus transaction requests to one or more memory controllers 1006.

Other devices can be connected to the system bus 1004. As illustrated in FIG. 10, these devices can include one or more display controllers 1008 and one or more PCIe controllers 1010, as examples. The memory controller(s) 1006 may interoperate with memory units 1012 through one or more memory interfaces 1014. Note that in an exemplary aspect, the memory interface(s) 1014 may be a PCIe bus, like the PCIe bus 106 of FIG. 1. The display controller(s) 1008 may communicate with a display 1016 through a display interface 1018. The display 1016 can include any type of display, including, but not limited to, a cathode ray tube (CRT), a liquid crystal display (LCD), a plasma display, a light emitting diode (LED) display, etc.

While not illustrated in FIG. 10, the processor-based system 1000 may also include a network interface device, which can be any device configured to allow exchange of data to and from a network (not illustrated). The network can be any type of network, including, but not limited to, a wired or wireless network, a private or public network, a local area network (LAN), a wireless local area network (WLAN), a wide area network (WAN), a BLUETOOTH™ network, and the Internet. The network interface device can be configured to support any type of communications protocol desired.

With continued reference to FIG. 10, the PCIe controller(s) 1010 may communicate with one or more PCIe devices 1020 such as the PCIe endpoints 104(1)-104(M) of FIG. 1 and the PCIe endpoints 904(1)-904(4) of FIG. 9 through one or more PCIe interfaces 1022 or the PCIe buses 106 and 908.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the message flow and flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of passing information in a Peripheral Component Interconnect (PCI) express (PCIe) system, comprising:
   receiving at a host a signal from a PCIe endpoint comprising:
      a header; and
      a body comprising:
         extended message signaled interrupt (MSI) message data comprising a system level identifier for the PCIe endpoint set by the host and indicating interrupt authorization in at least one of a first sixteen bits; and
         MSI message data in at least one of a second sixteen bits;
         wherein the first sixteen bits are between the header and the second sixteen bits;
   extracting, at a root complex of the host, the body from the signal to form an MSI vector with the extended MSI message data still in a body of the MSI vector; and
   passing over an internal bus the MSI vector to an interrupt controller in the host with the extended MSI message data still in the body of the MSI vector.

2. The method of claim 1, wherein receiving at the host the signal comprising the header comprises receiving at the host the signal comprising a requester identifier in the header.

3. The method of claim 1, wherein receiving at the host the body comprising the extended MSI message data comprises receiving the body comprising interrupt priority information.

4. The method of claim 1, further comprising extracting, at the interrupt controller, the system level identifier from the extended MSI message data prior to acting on the MSI message data.

5. The method of claim 1, wherein receiving at the host the body comprising the extended MSI message data comprises receiving the body comprising additional message data.

6. The method of claim 1, further comprising configuring the PCIe endpoint with the system level identifier prior to receiving at the host the signal.

7. The method of claim 1, further comprising inquiring, from the host to the PCIe endpoint, whether the PCIe endpoint is capable of sending the extended MSI message data.

8. The method of claim 1, further comprising configuring the interrupt controller in the host to use the extended MSI message data in the body of the MSI vector.

9. The method of claim 1, further comprising:
generating at a slave in a PCIe system, the signal comprising:
the header; and
the body distinct from and following the header; and
the MSI message data in the at least one of the second sixteen bits; and
sending the signal to the host of the PCIe system.

10. The method of claim 9, wherein the header comprises a requester identifier for the slave.

11. The method of claim 9, wherein the extended MSI message data comprises at least one of interrupt priority information and interrupt moderation information.

12. The method of claim 9, further comprising receiving a capability inquiry from the host.

13. The method of claim 12, further comprising responding to the capability inquiry with information indicating that the slave is capable of using the extended MSI message data.

14. A host in a Peripheral Component Interconnect (PCI) express (PCIe) system, comprising:
an internal bus;
a PCIe bus interface configured to be coupled to a PCIe bus, wherein the PCIe bus interface is further configured to receive a signal from the PCIe bus comprising:
a header; and
a body comprising:
extended message signaled interrupt (MSI) message data in at least one of a first sixteen bits comprising a system level identifier for a PCIe endpoint set by the host; and
MSI message data in at least one of a second sixteen bits;
an interrupt controller coupled to the internal bus;
a memory management unit coupled to the internal bus; and
a root complex coupled to the PCIe bus interface and the memory management unit, wherein the root complex is configured to extract the body from the signal to form an MSI vector with the extended MSI message data still in a body of the MSI vector and pass the MSI vector to the interrupt controller with the extended MSI message data still in the body of the MSI vector through the memory management unit and the internal bus;
wherein the interrupt controller is configured to determine whether to act on the MSI message data based on the system level identifier.

15. A slave in a Peripheral Component Interconnect (PCI) express (PCIe) system, comprising:
a PCIe bus interface configured to be coupled to a PCIe bus;
a capability register comprising information indicating that a slave can use extended message signaled interrupt (MSI) message data;
a configuration register comprising a system level identifier common to another slave in the PCIe system; and
a control system configured to:
detect an interrupt need condition;
assemble a signal comprising:
a header; and
a body comprising:
the extended MSI message data comprising the system level identifier in at least one of a first sixteen bits; and
MSI message data in at least one of a second sixteen bits; and
send the signal to a host over the PCIe bus.

16. A Peripheral Component Interconnect (PCI) express (PCIe) system, comprising:
a PCIe bus;
a PCIe slave comprising:
a slave PCIe bus interface coupled to the PCIe bus;
a slave control system configured to:
detect an interrupt need condition;
assemble a signal comprising:
a header; and
a body comprising:
extended message signaled interrupt (MSI) message data in at least one of a first sixteen bits comprising a system level identifier for the PCIe slave set by a host and indicating interrupt authorization; and
MSI message data in at least one of a second sixteen bits; and
send the signal to the host over the PCIe bus; and
the host comprising:
an internal bus;
a host PCIe bus interface coupled to the PCIe bus, wherein the host PCIe bus interface is further configured to receive the signal;
an interrupt controller coupled to the internal bus; and
a root complex coupled to the host PCIe bus interface, wherein the root complex is configured to extract the body from the signal to form an MSI vector with the extended MSI message data still in a body of the MSI vector and pass the MSI vector to the interrupt controller with the extended MSI message data still in the body of the MSI vector through the internal bus.

17. A method of identifying a signal source in a Peripheral Component Interconnect (PCI) express (PCIe) system, comprising:
receiving at a host a signal from a Peripheral Component Interconnect (PCI) express (PCIe) endpoint comprising:
a header having a requester identifier; and
a body comprising:
a source identifier for the PCIe endpoint set by the host in at least one of a first sixteen bits; and
message signaled interrupt (MSI) message data in at least one of a second sixteen bits;
at a root complex of the host, removing the requester identifier;

extracting the body to form an MSI vector with the source identifier still in a body of the MSI vector; and passing over an internal bus the MSI vector to an interrupt controller in the host with the source identifier still in the body of the MSI vector.

18. The method of claim 17, further comprising using the source identifier at the interrupt controller to verify the PCIe endpoint as authorized to request an interrupt.

19. The method of claim 17, further comprising initiating a capability query at the host to the PCIe endpoint.

20. The method of claim 19, further comprising receiving a response to the capability query from the PCIe endpoint indicating the PCIe endpoint is capable of using the source identifier in the body of the signal.

21. The method of claim 20, further comprising instructing the PCIe endpoint to enable use of the source identifier in the body of the signal.

22. The method of claim 17, further comprising configuring the interrupt controller to read the source identifier in the body of the MSI vector.

23. A host comprising:
a bus interface configured to be coupled to a Peripheral Component Interconnect (PCI) express (PCIe) bus;
a root complex coupled to the bus interface, the root complex configured to:
set a source identifier for at least one endpoint;
receive a signal from the bus interface comprising:
a header containing a requester identifier; and
a body comprising:
the source identifier in at least one of a first sixteen bits; and
message signaled interrupt (MSI) message data in at least one of a second sixteen bits;
remove the header from the signal; and
send an MSI vector to an interrupt controller containing the body of the signal including the source identifier in a body of the MSI vector; and
the interrupt controller configured to receive the MSI vector containing the source identifier in the body of the MSI vector.

24. The host of claim 23, wherein the host is configured to query a PCIe endpoint as to capabilities of the PCIe endpoint.

25. The host of claim 23, wherein the host is configured to receive a capability response from a PCIe endpoint indicating the PCIe endpoint can embed the source identifier in the body of the signal.

26. A method of identifying a signal source, comprising:
receiving at a host a signal from a Peripheral Component Interconnect (PCI) express (PCIe) endpoint comprising:
a header having a requester identifier; and
a body comprising:
a system level identifier for the PCIe endpoint set by the host in at least one of a first sixteen bits; and
message signaled interrupt (MSI) message data in at least one of a second sixteen bits;
at a root complex of the host, removing the requester identifier;
extracting the body to form an MSI vector with the system level identifier still in a body of the MSI vector; and
passing over an internal bus the MSI vector to an interrupt controller in the host with the system level identifier still in the body of the MSI vector.

27. A method of passing information in a Peripheral Component Interconnect (PCI) express (PCIe) system, comprising:
receiving at a host, from a PCIe endpoint, a signal comprising:
a header; and
a body, wherein the body comprises:
a first sixteen reserved bits having extended message signaled interrupt (MSI) message data in at least one of the first sixteen reserved bits and comprising a system level identifier for the PCIe endpoint set by the host; and
a second sixteen bits having MSI message data in at least one of the second sixteen bits;
extracting, at a root complex of the host, the body from the signal to form an MSI vector with the extended MSI message data still in a body of the MSI vector;
passing over an internal bus the MSI vector to an interrupt controller in the host with the extended MSI message data still in the body of the MSI vector; and
determining, at the interrupt controller, whether to act on the MSI message data based on the system level identifier.

28. The method of claim 1, wherein the internal bus comprises a system bus.

29. The host of claim 14, wherein the internal bus comprises a system bus.

30. The PCIe system of claim 16, wherein the internal bus comprises a system bus.

31. The method of claim 26, wherein the internal bus comprises a system bus.

* * * * *